Jan. 5, 1937.  B. G. PLUMMER  2,066,852

SWIVEL CHAIN LINK

Filed Feb. 25, 1935

Inventor
B. G. Plummer
by Hazard and Miller
Attorneys.

Patented Jan. 5, 1937

2,066,852

UNITED STATES PATENT OFFICE 2,066,852

SWIVEL CHAIN LINK

Benjamin G. Plummer, Long Beach, Calif.

Application February 25, 1935, Serial No. 8,038

14 Claims. (Cl. 74—246)

My invention relates principally to a swivel chain link of a type suitable for a power chain drive using sprocket chains and sprocket wheels. My invention departs from the usual type of sprocket chain in using a single bar to form the main portion of the link and connecting the bar links. There is a swivel coupling including a connecting coupling with ball swivels for the individual bar links.

In my invention in this type of swivel chain, one of the objects and features is the construction of a swivel coupling which may be made as a single unitary element or in two detachable parts but the characteristic distinction from the usual type of swivel coupling is that the ball portion of the link is inserted and removed through the end of the coupling through which this operates. When in its working assembly there are bearings having a partly spherical configuration fitted in the coupling which retains the ball on the end of the ball link in position in the coupling.

Another feature of my invention relates to the disassembling of the bearings and the balls from the coupling. In one form the coupling is made in two threaded sections which may be attached to and when unthreaded each section may be thrust along the bar link and the bearings removed. It is desirable to make the bearing in two or more parts so they can be readily disassembled. In another form of my invention the coupling is made integral and has an opening on one side. This allows the two balls of adjacent bar links to be moved towards each other and the bearings to be moved through this side opening of the coupling.

In my invention, on account of the bearings being in several parts the outward thrust is transmitted to the parts of the coupling which at the ends are made of sufficient strength to resist the outward expansion, substantially cylindrical grooves of relatively large diameter formed in the periphery with their axes extending longitudinally thereof. Each large recess is connected by a semi-cylindrical recess of less diameter. The larger recesses are for the purpose of accommodating the couplings and the smaller recesses receive the bar portion of the links when the chain passes over the sprocket wheel.

My invention is illustrated in connection with the accompanying drawing, in which, Fig. 1 is a plan of a section of my swivel chain and a sprocket wheel with which the chain operates;

Figure 1:
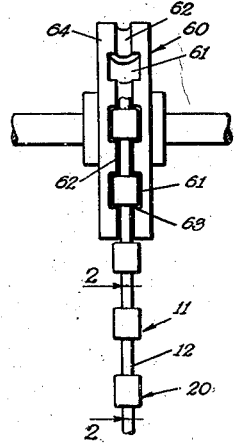

In my construction, a bar link is indicated by the numeral 11, this preferably has a cylindrical bar 12 and at each end there are heads 13. Each of these heads has a spherically curved surface 14 and a flat end 15. The center of the spherical curvature is indicated at 16 and a diametrical measurement is indicated at 17. It will thus be seen that the surface 15 is beyond a diameter which is at right angles to the axis of the bar link and therefore this surface 15 is of a diameter slightly less than that of the greatest diameter of the portion of the head of greatest curvature. The bar portion 12 merges with the head 13 on a circular line 18. The heads on both ends of the bar are of equal size and curvature. The bar portion of the link may be made in variable proportions to that of the size of the head.

Figure 2:
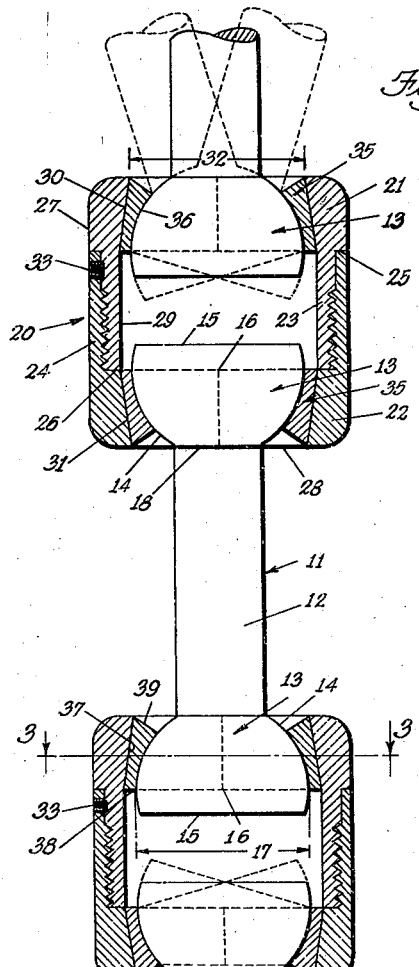
Fig. 2 is a longitudinal section through a portion of the chain, the coupling elements being shown in longitudinal section and the bar links with the balls in elevation.
Figure 3:
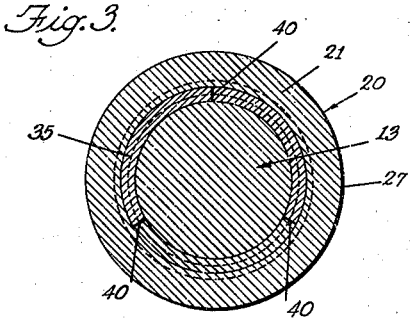
Fig. 3 is a transverse section on the line 3—3 of Fig. 2, in the direction of the arrows.

In the construction of Figs. 2 and 3, the heads of two adjacent links are connected for operation by a coupling designated by the numeral 20. This coupling is shown as having complementary coupling collars 21 and 22. The collar 21 has a reduced inner portion 23 externally screw threaded, whereas the coupling 22 has a reduced end portion 24 which is internally screw threaded. Thus each of the coupling collars has an abutment shoulder, the shoulder on the collar 21 being indicated as 25 and the internal shoulder on the collar 22 as shoulder 26, so that when the coupling collars are threaded together, the ends of the members 23 and 24 respectively may abut against the shoulders 25 and 26.

The outside surface of the coupling 20 designated 27 is preferably cylindrical and the ends 28 are at right angles to the axis of the coupling. The internal surface 29 at the extension 23, which is the inward extension of the collar 21, is also cylindrical. However, the inside surfaces 30 and 31 on the collar members 21 and 22 respectively are tapered from this cylindrical internal surface 29 to the ends 28 of the coupling. The diametrical measurement 32 across the smallest diameter of the tapered portion 30 of the coupling, that is of each coupling collar, is slightly greater than the diametrical measurement 17.

In order to prevent the two parts of the coupling becoming unthreaded or loosened, a countersunk set screw 33 may be utilized in which case a portion of the inner thread should be omitted so that such thread will not become destroyed by the set screw.

At each end of the coupling there is a bearing designated 35 which is made of a plurality of bearing sections either two or more in number. Each of these has a cylindrical curved surface 36, an outer tapered surface 37 to conform to the inside surfaces 30 and 31 of the collar members 21 and 22 respectively. The inner edge 38 of the bearing periphery terminates on a diametrical line through the ball or head 13. The outer surface 39 is preferably bevelled. In the illustration in Fig. 3, there are three bearing sections shown, these have longitudinal joints 40.

The bearings are assembled when the coupling elements are unscrewed one from the other and when the bearings are removed the head 13 may be thrust through the circular opening 32 at the end of each coupling element. The diametrical measurement at 32 as above mentioned is slightly greater than the diametrical measurement 16 of the cylindrical part of the ball head. The bar may thus be thrust through each coupling element a sufficient distance so that the bearing pieces may be assembled around the head of the ball and then slid into place so that the bearings wedge tightly on the tapered surfaces 30 and 31. The two coupling collars 21 and 22 may then be threaded together and if desired secured by the set screw. The pull on the chain thus causes the spherical shaped heads to retain the bearings properly seated. A swivel action is provided for as each head and its disconnecting bar 12 may swivel from an axial line of the coupling to the dotted line position shown in Fig. 2. The collars of the coupling are so proportioned that even if both heads and bars are swivelled in the same direction, there will be no contact between the peripheral edge of the flat surface 15. The circular junction line of the bevelled surface 39 and the cylindrical surface 36 limit the swivelling action by engaging the cylindrical rod 12. It will thus be seen that the angle that the rods 12 of adjacent links may occupy as to each other is double the angle that each link may occupy in reference to the longitudinal axis of the coupling when the two collars thereof are in an assembled position.

Figure 4:
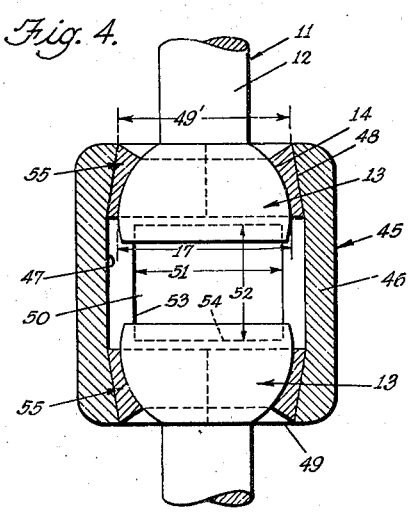
Fig. 4 is a longitudinal section similar to a portion of Fig. 2, showing a modified construction with the coupling illustrated as of an integral body with an aperture for removal of the bearings.

In Fig. 4 I illustrate a modified construction in which the coupling is formed of a single sleeve 45. This has a central section 46 which is preferably cylindrical on its inside surface 47 and at each end of the cylindrical portion there are inwardly tapered inside surfaces 48 terminating at the ends 49 of the collar. The links are formed of bars with heads 13 similar to the construction of Fig. 2. The measurement 49 on a diameter across the end of the tapers 48 is slightly greater than the diameter measurement 17 of the ball like heads. In this construction the collar is provided with an aperture 50 on one side. This aperture may be considered as having a circumferential measurement 51 and a longitudinal measurement 52, these being defined by the longitudinal edges 53 and the circumferential edges 54 of the aperture.

Bearings 55 of the same type as described in connection with Figs. 2 and 3 are utilized, but in this construction it is practically necessary to have these at least in three segments although more divisions may be utilized if desired. Each of the bearing pieces has a spherical curvature on the inside to coact with the ball of the head, an outside taper corresponding to the taper 48, an inner plane edge transverse to the axis of the coupling which is substantially on a diameter of a ball head when the link assemblage is in operative position. The bevel on the outside edge corresponding to 39 is for the purpose of allowing a lateral swivelling of the bar of the link.

In assembling a chain of this type having the solid collar, one of the heads may be inserted through one of the end openings having a clearance above mentioned at the measurement 49'. The segments forming the bearing may then be inserted through the aperture 50 and the three bearing sections adjusted on the ball and then forced into engagement with the tapered surface 48. The axis of the rod 12 is then adjusted in alignment with the axis of the coupling collar and the other ball is then inserted until the plane faces 15 contact as shown by the dotted line in Fig. 4. Then the bearing segments for this latter head are adjusted on the head and then pulled into engagement with the tapered surface 48 at the opposite end of the coupling. When these bearing surfaces are properly assembled the pull on the chain holds them in proper position and in addition the tapered wedge surface prevents them from becoming disassembled.

When it is desired to disassemble the coupling to remove one or both of the links from the collar, the operation is the reverse of that above described, that is, one of the balls is forced inwardly until its plane inner face contacts with that of the outer ball or at least a sufficient distance so that the segments forming the bearing may be shoved inwardly to the cylindrical portion of the collar and then one segment at a time removed through the aperture 50. The circumferential measurement 51 is sufficient to accommodate a bearing segment on its longitudinal measurement and the aixal measurement 52 of the aperture is sufficient to accommodate the length of each segment considered in an axial direction. When the three segments or more on which the displaced ball bears have been removed through the aperture, such ball may be withdrawn through the end opening of the coupling. The other ball may then be removed in a similar manner.

In the construction of Fig. 4, the links connected to the coupling may swivel in the same manner as illustrated in connection with Fig. 2. This construction is quite suitable for a type of chain which may operate in oil or in a place where it is not subject to accumulation of dirt, but the construction of Fig. 2 having a closed coupling is probably better in exposed positions as the space in the coupling between the ball heads may be packed with grease or oil.

In the construction of the sprocket wheel 60, this has a plurality of large recesses 61 spaced apart by connecting grooves 62 of lesser diameter. Both the recesses and the grooves may be each a semicylinder thus providing transverse shoulders 63 at the junction of each recess and groove. The recesses and grooves should be of such a depth that each is substantially a semicylinder, the axis of which is on a cord of the periphery 64 of the sprocket wheel, which periphery if desired may be a cylinder. Of course, it is manifest that the recesses and grooves if desired may be deeper than a semicylinder.

When the chain is assembled to operate with the sprocket wheel as above described, the ends 28 of the coupling of Fig. 2 or 49 of Fig. 4 engage the shoulders 63. There should be sufficient clearance in the recesses and the grooves to accommodate the couplings and the bars 12 both as to their diameter and longitudinal length. It is desirable to have the solid couplings of Fig. 4 and the screw threaded connected couplings of Fig. 2 of the same length so that these may be used in the same chain. Therefore it will only be necessary to use one screw threaded coupling in a chain for leading the chain of a pair of sprocket wheels and securing it in place or disconnecting such chain. It will thus be seen that the chain may be used to drive the sprocket wheel or the sprocket wheel may be used to drive the chain and thus transmit motion. It is manifest that the diameter of the sprockets must be such as to properly accommodate the swivel action of the links and couplings.

On account of having the bearings on which the ball shaped heads of the links operate, in a plurality of parts, the outward pressure due to a tension on the rods of the links causes these bearings to transmit an outward or a bursting pressure on the collar of the coupling, but this collar is especially strengthened at the ends due to the thickening caused by the tapered surface on which these bearings are seated.

Various changes may be made in the details of construction without departing from the spirit or scope of the invention as defined by the appended claims.

I claim:

1. In a swivel chain, the combination of a coupling having a tubular collar with a central portion of larger internal diameter and tapers at each end, the tapers being outwardly, a pair of rod like links, each having a head of a ball type, the collar having an opening at each end of larger diameter than the ball on a head to be inserted through said opening, a bearing formed of a plurality of sections at each end of the collar, each bearing having a tapered outer surface to non-rotatably engage the taper of the collar and each head and each bearing having spherical bearing surfaces, each bearing being disconnectible from its tapered contact with the collar whereby such bearing may be thrust inwardly in the portion of the collar of largest diameter and thereby the sections of each bearing may be separated one from another and removed from the collar one at a time, each head therefore being removable through the open end of the collar through which it may be inserted after removal of the sections of the bearing.

2. In a swivel chain, the combination of a coupling having a tubular collar with a central portion of larger internal diameter and tapers at each end, the tapers being outwardly towards open ends at each end of the collar, a pair of rod-like links each having a head of a ball type and having a spherical curvature greater than a hemisphere, the diameter of each head being less than the opening so that the head may be inserted through such opening, a bearing formed of a plurality of sections insertable and removable one at a time, each bearing having an outer tapered surface to non-rotatably engage the taper at an end of the collar and also having a spherical bearing surface to engage the spherical surfaces of the adjacent head.

3. In a swivel chain as claimed in claim 2, each head having an inner plane surface at right angles to its axis, whereby one head may be thrust inwardly in the collar to bring the plane surfaces of the heads into contact thus freeing one of the bearings so that the bearing sections may be disengaged from the taper of the collar, the collar having means for removing the sections of such bearing one at a time whereby the head which formerly engaged the removable bearing may be removed through the end of the collar.

4. In a swivel chain as claimed in claim 2, the collar being formed in two sections secured together, whereby said sections may be disconnected and the bearing attached to each section removed through the part of the coupling adjacent the central portion.

5. In a swivel chain as claimed in claim 2, the collar being formed of one piece and having a lateral opening through which the sections of the bearing may be removed after thrusting one of the heads inwardly to disengage such head from the bearing it is desired to remove.

6. In a swivel chain, the combination of a coupling having a tubular collar with an opening at each end formed in two sections with a threaded connection, the collar having an internal cylindrical surface, the end of each collar section having a taper towards the adjacent end opening, the largest diameter of the taper being equal to the inside cylindrical diameter, a pair of links each having a rod with an enlarged head, the head having a portion with a spherical curvature and a plane end at right angles to the axis of the rod and the head, the plane end being of lesser diameter than the diameter of the sphere of each head, two bearings each having a tapered surface non-rotatably engaging the taper at an end of the collar section and having a spherical curvature engaging the spherical surface of the adjacent head, each bearing being in a plurality of sections with longitudinal joints and having an inner edge substantially on a diameter of the sphere of the head when the axis of the rod and head is aligned with the axis of the collar, the outside edge of each bearing having an outward bevel from the head to permit swivelling of the rod, the opening at each head being of greater diameter than the diameter of the head insertable through such opening, the said coupling and rods being disconnectible by unscrewing the collar sections, thrusting a head inwardly in its section and removing the bearing elements against which said head seated, then removing the head through the opening at the end of the collar section.

7. In a swivel chain, the combination of a coupling having a collar formed integral, having an internal cylindrical section, the collar having internal tapered surfaces tapering towards each end to an end opening, the portion of the collar between the two end tapers having an opening, a bearing formed of a plurality of sections non-rotatably engaging each taper of the collar, each bearing having an inside spherical bearing surface, a pair of links, each having a rod and a head, each head having a spherical curvature terminating in a plane surface at right angles to the axis of the rod and the head, the diameter of the plane surface being less than the diameter of the sphere of the head, the diameter of the sphere of the head being less than the diameter of the end opening through which said head may be inserted, the spherical surface of the head engaging the spherical surface of the bearing, each bearing having an inner end substantially on a diametrical plane of the spherical head resting on such bearing when such head and its rod are in axial alignment with the collar, each head and its bearing being removable by thrusting such head inwardly, then disengaging the bearing sections from the tapered end of the collar, removing each bearing section through the opening in the collar and then removing the head through the end opening.

8. In a swivel chain a coupling having a tubular collar with an opening at one end, the collar having an internal cylindrical surface with the end at the opening having a taper towards such opening, the largest diameter of the taper being equal to the inside cylindrical diameter, a rod with an enlarged head, the head having a portion with spherical curvature and a plane end at right angles to the axis of the rod and the head, the plane end being of lesser diameter than the diameter of the sphere of the head, a bearing having a tapered surface non-rotatably engaging the taper at the end of the collar section and having a spherical curvature engaging the spherical surface of the adjacent head, each bearing being in a plurality of sections with longitudinal joints and having an inner edge and substantially on a diameter of the sphere of the head when the axis of the rod and the head is in line with the axis of the collar, the outside edge of each bearing having an outward bevel from the head to permit swiveling the rod, the opening at the end of the collar being of greater diameter than the diameter of the head insertable through such opening.

9. In a swivel chain as claimed in claim 8, the said collar having an opening in one side, the said rod and head being movable in the collar to unseat the head from the bearing, the said bearing being removable in sections through the said side opening whereby after removal of the sections of the bearing the head may be removed through the opening at the end of the collar.

10. In a swivel chain, the combination of a coupling having a tubular collar with an opening at each end, a pair of rodlike links, each having a head of a ball type having a spherical curvature greater than a hemisphere, the diameter of the head being less than the opening so that the head may be inserted or removed through such opening, a bearing formed of a plurality of separable sections and fitted in the collar adjacent each opening whereby the said head has a universal joint seating on the said bearing sections, the bearing sections being insertable and removable one at a time, the collar being formed in two sections secured together whereby said sections may be disconnected and the bearing attached to each section removed through the part of the coupling adjacent the central portion.

11. In a swivel chain, the combination of a coupling having a tubular collar with an opening at each end, a pair of rodlike links, each having a head of a ball type having a spherical curvature greater than a hemisphere, the diameter of the head being less than the opening so that the head may be inserted or removed through such opening, a bearing formed of a plurality of separable sections and fitted in the collar adjacent each opening whereby the said head has a universal joint seating on the said bearing sections, the bearing sections being insertable and removable one at a time, the collar being formed of one piece and having a lateral opening through which the sections of the bearing may be removed after thrusting one of the heads inwardly to disengage such head from the bearing it is desired to remove.

12. In a swivel chain, the combination of a coupling having a tubular collar with an opening at each end, a pair of rodlike links, each having a head of a ball type with a spherical curvature greater than a hemisphere and each with a flat inner end, the diameter of each head being less than the opening in which it is fitted so that the head may be inserted or removed through such opening, a bearing formed of a plurality of individual bearing sections fitted in the collar adjacent each opening, each head having a universal joint action on the bearing sections on which it is seated, one head at a time being adapted to be thrust inwardly into the tubular collar to contact the flat faces of the heads and thereby permit disengagement of the individual bearing sections on which the head thrust inwardly had been seated so that said sections may be removed through the opening at one end of the coupling one at a time, the said sections being adapted to be inserted through the opening and assembled in a reverse procedure.

13. In a swivel chain as claimed in claim 12, the collar being formed in two sections screw threaded together with means to prevent their unthreading whereby when desired the said sections may be disconnected and the bearing sections attached to each of the sections of the collar removed through the part of the collar adjacent the central portion.

14. In a swivel chain as claimed in claim 12, the collar having an inside diameter greater than the said openings and being formed in one piece and having a lateral opening of insufficient size to allow removal of either of the heads therethrough and of insufficient size to allow removal of a bearing without disassembling the sections, but to permit the removal of the bearing sections one at a time.

B. G. PLUMMER.